Dec. 15, 1953   A. P. LIEN ET AL   2,662,926
PENTAMETHYLBENZENE DISPROPORTIONATION
Filed Aug. 31, 1950
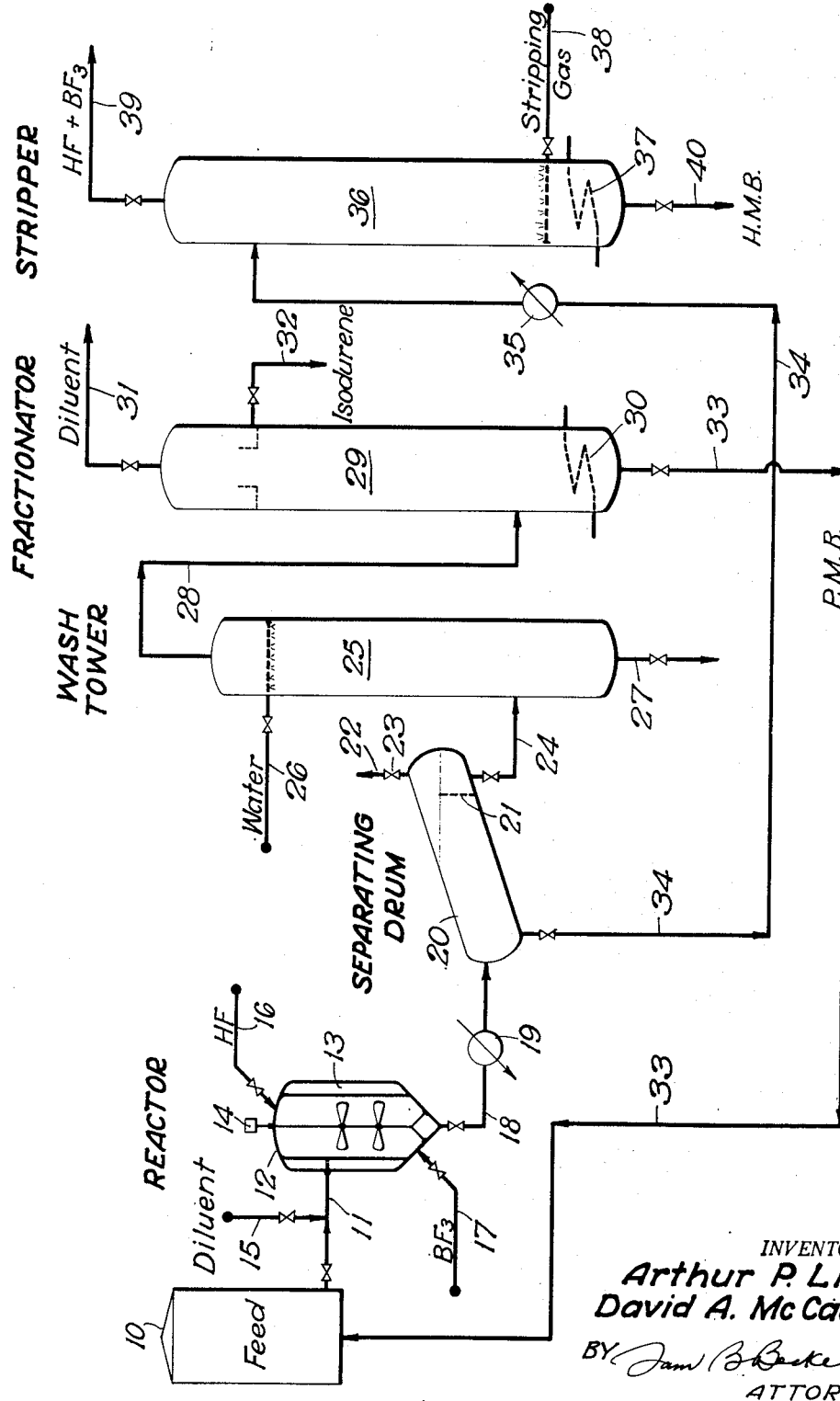
INVENTORS:
Arthur P. Lien
David A. McCaulay
BY James B. Becker
ATTORNEY Patented Dec. 15, 1953

2,662,926

UNITED STATES PATENT OFFICE 2,662,926

PENTAMETHYLBENZENE DISPROPORTIONATION

Arthur P. Lien, Hammond, Ind., and David A. McCaulay, Chicago, Ill., assignors to Standard Oil Company, Chicago, Ill., a corporation of Indiana Application August 31, 1950, Serial No. 182,611

5 Claims. (Cl. 260—671)

This invention relates to a novel process for the catalytic disproportionation of pentamethylbenzene. More particularly, it relates to an HF–BF$_3$ catalyzed process for the disproportionation of pentamethylbenzene to produce essentially only two reaction products, viz., isodurene (1,2,3,5-tetramethylbenzene) and hexamethylbenzene.

Pentamethylbenzene has heretofore been disproportionated by catalytic processes which have, unfortunately, been depreciated by one or more important defects. Thus, pentamethylbenzene has heretofore been subjected to the disproportionating action of concentrated sulfuric acid in the so-called Jacobsen rearrangement (note, for example, Lee Irvin Smith and Albert R. Lux, J. Am. Chem. Soc. 51, 2994 (October, 1929)). The Jacobsen rearrangement is limited to the use of conditions mild enough to insure relative freedom from side reactions, under which conditions the reaction rate is very low. The tetramethylbenzene product of the Jacobsen rearrangement is exclusively prehnitene. The prehnitene is obtained in the Jacobson process as the sulfonic acid derivative which must be converted to the sodium salt, which in turn must be very carefully hydrolyzed with superheated steam in order to obtain the pure hydrocarbon.

The disproportionation of pentamethylbenzene in the presence of aluminum chloride has been studied (Gustav Egloff, "The Reactions of Pure Hydrocarbons" Reinhold Publishing Corporation, N. Y., 1937, pp. 551–2). At temperatures between about 50 and 110° C. the reaction rate is low and the yields of isodurene are, likewise, low. Under more severe operating conditions such as 130 to 140° C. the principal reaction appears to be the formation of methyl chloride and lower methylated benzenes, from which no hexamethylbenzene can be obtained. In any case, the employment of AlCl$_3$ leads to the production of isomeric tetramethylbenzenes from which the separation of substantially pure isodurene is a practical impossibility (Organic Syntheses, 10, 362 (1930)).

One object of the present invention is to provide a novel process for the disproportionation of pentamethylbenzene. Another object of our invention is to provide new catalysts for the disproportionation of pentamethylbenzene. Still another object of our invention is to provide an HF–BF$_3$ catalyzed process for disproportionating pentamethylbenzene to produce high yields of substantially pure isodurene and hexamethylbenzene. Still another object of our invention is to provide an HF–BF$_3$ catalyzed process for the disproportionation of pentamethylbenzene in which the catalyst serves also as a means for separating the products of reaction. These and other objects of our invention will become apparent from the ensuing description thereof, together with the accompanying figure.

In accordance with the process of the present invention, a charging stock comprising essentially pentamethylbenzene is contacted with a substantial molar excess of liquid hydrogen fluoride and at least about an equimolar proportion of BF$_3$, based on said pentamethylbenzene, at a reaction temperature between about 20 C. and about 80° C. under a pressure sufficient at least to maintain the liquid phase. The liquid hydrogen fluoride is employed in proportions between about 2 and about 30 mols, preferably between about 3 and about 8 mols, per mol of pentamethylbenzene in the charging stock. The BF$_3$ concentration in the reaction zone is usually selected within the range of about 1 to about 3 mols, preferably about 1.1 to about 1.3 mols, per mol of pentamethylbenzene in the charging stock. Although larger molar proportions of BF$_3$ may be employed, they will necessitate the employment of high pressure reaction equipment, which is ordinarily economically undesirable. The reaction temperature is usually selected within the range of about 20° C. to about 80° C., although somewhat lower or higher temperatures may be employed. Usually we prefer to operate the pentamethylbenzene disproportionation process of the present invention at temperatures between about 30° C. and about 70° C., under which conditions a smooth disproportionation occurs to yield isodurene and hexamethylbenzene as the substantially exclusive products of disproportionation. The reaction pressures necessary to maintain substantially liquid phase reaction conditions are moderate and usually fall within the range of about 25 to about 150 p. s. i. g.

We have observed that polymethylbenzenes are characterized by the formation of complex compounds with BF$_3$ and liquid hydrogen fluoride, said complexes containing 1 mol of BF$_3$ and presumably 1 mol of HF per mol of polymethylbenzene, the whole complex being dissolved in excess liquid hydrogen fluoride. The relative basicities of the various polymethylbenzenes towards liquid HF and BF$_3$ are variable and depend upon the specific polymethylbenzene. The relative ease of formation and especially the stabilities of the HF–BF$_3$ complexes of polymethylbenzenes are, likewise, variable, apparently in rather direct proportion to the relative basicities of the polymethylbenzenes in question. Of the polymethylbenzenes, para-xylene has been shown to form the least stable complex with liquid HF and BF$_3$ and, therefore, relative separation factors based on para-xylene have been determined.

The separation factor, α, is the mol ratio of components in the extract layer/mol ratio of components in the raffinate layer. The following table presents alpha values for the charging stock and products of the process of the present invention.

| | α value, relative to para-xylene =1 | α Ratios |
|---|---|---|
| Hexamethylbenzene | 44,500 | 15.9 |
| Pentamethylbenzene | 4,350 | 1.5 |
| Isodurene | 2,800 | 1.0 |

Accordingly, when the $BF_3$ concentration in the reaction products is reduced to a value not substantially greater than the molar concentration of hexamethylbenzene therein, the hexamethylbenzene is obtained as a solution or complex with liquid HF and $BF_3$, whereas unconverted pentamethylbenzene and isodurene are obtained as a supernatant hydrocarbon or "raffinate" layer. Accordingly, it will be apparent that liquid hydrogen fluoride and $BF_3$ function not only as desirable catalysts in the present disproportionation process, but are additionally of great use and value in affording a means to separate the reaction products.

In order more fully to illustrate one form of the invention, reference is made to the accompanying flow diagram. In the figure, a pentamethylbenzene charging stock from storage tank 10 is passed through valved line 11 into a reactor 12 which may take the form of an autoclave provided with a temperature control jacket 13 and a mechanically or magnetically actuated stirrer 14. The pentamethylbenzene can be introduced into the reactor either as a solid (M. P., 54° C.) or as a liquid. Storage tank 10 can be suitably heated to maintain pentamethylbenzene in molten condition. If desired, a diluent, for example a liquefied or normally liquid saturated hydrocarbon, for example pentane, petroleum ether, cyclohexane, n-octane, a saturated petroleum naphtha or the like, can be introduced into the reactor 12 through valved lines 15 and 11. Liquid hydrogen fluoride can be introduced into reactor 12 through valved line 16 and $BF_3$ through valved line 17. A substantial molar excess of liquid hydrogen fluoride, between about 20 and about 30 mols per mol of pentamethylbenzene, can be introduced into reactor 12. The amount of $BF_3$ introduced through valved line 17 may be between about 1 and about 2 mols per mol of pentamethylbenzene in the charging stock. The contents of the reactor are intimately agitated and brought into contact at a desirable reaction temperature, for example between about 60° C. and about 80° C., under a pressure sufficient substantially to maintain the liquid phase for a sufficient period to obtain substantial reaction, for example between about 5 and about 180 minutes. Thereafter, part or all of the reactor contents are withdrawn through valved line 18 and heat exchanger 19 into a separating drum 20 provided with a weir 21 and a vent line 22 containing a pressure reducing valve 23. Boron trifluoride is released through valve 23 in sufficient amount to reduce its proportion in the liquid contents of drum 20 to a value substantially equimolar with or somewhat less than the molar concentration of hexamethylbenzene therein. As a result a lower liquid layer comprising essentially a solution of hexamethylbenzene and $BF_3$ in excess liquid hydrogen fluoride separates out as the lower layer in drum 20. The separation of layers may be facilitated by the introduction of a light inert hydrocarbon, for example a low boiling saturated hydrocarbon, as a countersolvent. Thus, low boiling saturated hydrocarbons can be introduced through drum 20 (by a line not shown) to increase the concentration thereof in drum 20 to a value between about 0.5 and about 5 volumes per volume of aromatic hydrocarbons in said zone. Suitable countersolvents are identical with the diluents whose introduction into reactor 12 through valved line 15 has been described above. An upper liquid layer of uncomplexed pentamethylbenzene and isodurene flows over weir 21 in drum 20, from which it is removed from time to time through valved line 24 into a wash tower 25 wherein it is countercurrently washed with water or dilute alkali, introduced into the upper portion thereof through valved line 26, spent wash liquid being removed from the lower end thereof through valved line 27. The washed hydrocarbon layer passes overhead of tower 25 through line 28 into a fractionating tower 29 provided with a reboiler 30. The light hydrocarbon diluent employed in the process is taken overhead of fractionating tower 29 through line 31, whence part may be condensed and recycled as reflux and the remainder recycled (by lines not shown) to reactor 12 and/or separating drum 20. An isodurene fraction is trapped off through valved line 32 from the upper portion of tower 29 and a pentamethylbenzene bottoms fraction is withdrawn from the lower end of tower 29 through valved line 33 for recycle to storage tank 10. Line 33 can be suitably lagged or steam-heated to maintain the pentamethylbenzene in molten condition.

The solution of $HF$-$BF_3$-hexamethylbenzene complex in excess liquid hydrogen fluoride is withdrawn from the lower portion of separating drum 20 through valved line 34 and heat exchanger 35 into the upper portion of a stripping tower 36 provided with a reboiler coil 37 and a valved line 38 for the introduction of stripping gases such as methane, ethane, propane, nitrogen, carbon dioxide and the like. Decomposition of the $HF$-$BF_3$-hexamethylbenzene complex and stripping of HF and $BF_3$ occur in tower 36. Suitable operating conditions in tower 36 are a bottoms temperature between about 275 and about 325° C., a top temperature between about 225 and about 260° C. and pressures between about 15 and about 30 p. s. i. a. Hydrogen fluoride and $BF_3$ gases are withdrawn from the upper portion of tower 36 through valved line 39, whereafter they may be separated from stripping or diluent gases and recycled for reuse in the present process. The hexamethylbenzene product is withdrawn from the lower portion of tower 36 through valved line 40.

A specific although non-limitative example of our process is as follows. A mixture of 396 g. (2.67 mols) of pentamethylbenzene, 481 cc. of liquid commercial substantially anhydrous hydrogen fluoride and 190 g. (2.80 mols) of $BF_3$ were charged to a carbon steel reactor wherein they were mechanically agitated for 30 minutes at 65° C. The reaction mixture was then withdrawn into a Dry Ice cooled copper flask containing 600 g. of ice. The liberated hydrocarbon was dissolved in benzene and neutralized by washing with aqueous ammonia. The reaction mixture thus treated was then fractionated in a column containing the equivalent of 30 theoretical plates. Following are the results of the fractionation analyses:

|  | Product Distribution | | |
|---|---|---|---|
|  | g. | Mols | Mol Percent |
| Isodurene | 67 | .50 | 20 |
| Pentamethylbenzene | 217 | 1.47 | 60 |
| Hexamethylbenzene | 76 | .47 | 20 |
|  | 360 | 2.44 | 100 |

Increasing the reaction time to about 3 hours or increasing the reaction temperature to about 80° C. would result in conversion of about 95 percent or more of the pentamethylbenzene charging stock. It will be noted that the ultimate yields of isodurene and hexamethylbenzene are essentially quantitative. The disproportionation reaction was surprising in that only one $C_{10}$ product was obtained, viz., isodurene, in contrast to prehnitene which is obtained in the sulfuric acid-catalyzed Jacobsen reaction or to the mixture of isomers which is obtained in aluminum halide-catalyzed disproportionations.

The $C_{10}$ fraction of our product boiled at 198-199° C. and the refractive index ($n_D^{20}$) was constant over the boiling range at the value of 1.5130. Infra-red analysis showed the $C_{10}$ fraction to be 99+ percent isodurene; neither prehnitene nor durene was detected. The $C_{12}$ fraction of our product (20 mol percent) had a boiling point of 262° C. and a melting point of 165° C., which check closely with the literature values of 263.8° and 165.3° C., respectively, for hexamethylbenzene.

Hexamethylbenzene and its complexes have varied uses, some of which have been described in our copending application for Letters Patent Serial No. 146,776, filed February 28, 1950, now abandoned. The isodurene product of the present process is by far the most valuable of the tetramethylbenzenes suitable for inclusion in aviation gasoline as a high octane number blending component. The melting point of durene is 79.2° C., far too high to make it a practical high octane number blending component in gasolines. The isodurene product of the present process has substantial advantages over prehnitene for inclusion in aviation gasoline, attributable to its substantially lower melting point (−24° C. as against −6.8° C.), somewhat lower boiling point and its high blending octane number of 154. The isodurene produced by the present process may be employed as a charging stock for the preparation of numerous chemical derivatives, for example by processes of nuclear halogenation, particularly chlorination, employing well known nuclear halogenation catalysts such as iodine or iron, or by methyl group chlorination through the agency of sulfuryl chloride and peroxides. Isodurene may also be hydrogenated, oxidized, nitrated, sulfonated, aminated and otherwise converted to interesting chemical derivatives.

Having thus described our invention, what we claim is:

1. A process for the production of isodurene and hexamethylbenzene by the disproportionation of pentamethylbenzene, which process comprises treating a feed containing pentamethylbenzene as substantially the only reactive hydrocarbon, with at least about 2 mols of liquid HF per mol of said pentamethylbenzene and at least about 1 mol of $BF_3$ per mol of said pentamethylbenzene, at a temperature between about 20° and 80° C., for a time sufficient to produce an appreciable amount of isodurene and hexamethylbenzene; under a pressure sufficient to maintain said HF in the liquid phase, separating a product containing isodurene, pentamethylbenzene and hexamethylbenzene as substantially the only alkylbenzenes therein by removing HF and $BF_3$; and recovering isodurene and hexamethylbenzene from said mixture.

2. The process of claim 1 wherein said feed consists essentially of pentamethylbenzene and an inert hydrocarbon diluent.

3. A process for the production of isodurene and hexamethylbenzene by the disproportionation of pentamethylbenzene, which process comprises treating a feed containing pentamethylbenzene as substantially the only reactive hydrocarbon, with between about 3 and 8 mols of liquid HF per mol of said pentamethylbenzene and between about 1.1 and 1.3 mols of $BF_3$ per mol of said pentamethylbenzene, at a temperature between about 60° and 80° C., for a time between about 5 minutes and 3 hours, under a pressure sufficient to maintain said HF in the liquid phase, recovering a product mixture containing isodurene, pentamethylbenzene and hexamethylbenzene as substantially the only alkylbenzenes therein by removing HF and $BF_3$ and recovering isodurene and hexamethylbenzene from said mixture.

4. A process for the production of isodurene and hexamethylbenzene by the disproportionation of pentamethylbenzene, which process comprises (1) treating a feed containing pentamethylbenzene as substantially the only reactive hydrocarbon, with at least about 2 mols of liquid HF per mol of said pentamethylbenzene and at least about 1 mol of $BF_3$ per mol of said pentamethylbenzene, at a temperature between about 20° and about 80° C., for a time sufficient to produce an appreciable amount of isodurene and hexamethylbenzene, under pressure sufficient to maintain said HF in the liquid phase, (2) distilling sufficient $BF_3$ from said liquid HF-$BF_3$-product mixture to reduce the $BF_3$ content to about 1 mol per mol of hexamethylbenzene contained in said product mixture, (3) separating a raffinate phase containing isodurene and pentamethylbenzene from an extract phase containing substantially all of said hexamethylbenzene produced in step (1) and minor amounts of isodurene and pentamethylbenzene, and (4) recovering isodurene, pentamethylbenzene and hexamethylbenzene from said raffinate phase and said extract phase.

5. The process of claim 4 wherein said partial removal of $BF_3$ in step (2) is carried out in the presence of an inert hydrocarbon diluent added in an amount in excess of the solubility thereof in said extract phase, which diluent passes substantially entirely into said raffinate phase.

ARTHUR P. LIEN.
DAVID A. McCAULAY.

References Cited in the file of this patent

UNITED STATES PATENTS

| Number | Name | Date |
|---|---|---|
| 2,396,965 | Passino | Mar. 19, 1946 |
| 2,480,939 | Lee et al. | Sept. 6, 1949 |
| 2,521,444 | Brooke et al. | Sept. 5, 1950 |
| 2,528,893 | Lien et al. | Nov. 7, 1950 |

OTHER REFERENCES

Nightingale et al.: Jour. Amer. Chem. Sec., vol. 63, pages 3514-17, (December 1941) (4 pages).